(12) United States Patent
Jones et al.

(10) Patent No.: US 7,922,959 B2
(45) Date of Patent: *Apr. 12, 2011

(54) METHOD OF MANUFACTURING A COMPOSITE FILTER MEDIA

(75) Inventors: David Charles Jones, Midlothian, VA (US); Hyun Sung Lim, Midlothian, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/184,863

(22) Filed: Aug. 1, 2008

(65) Prior Publication Data

US 2010/0025892 A1    Feb. 4, 2010

(51) Int. Cl.
*D01D 5/08* (2006.01)
(52) U.S. Cl. .................... 264/454; 264/103; 264/173.1
(58) Field of Classification Search ............ 264/172.12, 264/DIG. 48, 454, 103, 173.1
See application file for complete search history.

(56) References Cited

U.S. PATENT DOCUMENTS

| | | | |
|---|---|---|---|
| 5,364,456 A | 11/1994 | Kahlbaugh et al. | |
| 5,437,910 A | 8/1995 | Raabe et al. | |
| 6,165,572 A | 12/2000 | Kahlbaugh et al. | |
| 6,274,521 B1 | 8/2001 | Barbier et al. | |
| 6,315,806 B1 | 11/2001 | Torobin et al. | |
| 6,368,386 B1 | 4/2002 | Nelson et al. | |
| 6,395,046 B1 | 5/2002 | Emig et al. | |
| 6,485,811 B1 | 11/2002 | Horiguchi et al. | |
| 6,656,400 B2 | 12/2003 | Veeser et al. | |
| 6,673,136 B2 | 1/2004 | Gillingham et al. | |
| 6,706,086 B2 | 3/2004 | Emig et al. | |
| 6,716,274 B2 | 4/2004 | Gogins et al. | |
| 6,740,142 B2 | 5/2004 | Buettner et al. | |
| 6,743,273 B2 | 6/2004 | Chung et al. | |
| 6,746,517 B2 | 6/2004 | Benson et al. | |
| 6,800,117 B2 | 10/2004 | Barris et al. | |
| 6,875,256 B2 | 4/2005 | Gillingham et al. | |

(Continued)

FOREIGN PATENT DOCUMENTS

| | | |
|---|---|---|
| EP | 1048335 | 5/2002 |
| WO | WO 02/12604 | 2/2002 |
| WO | 03080905 A1 | 10/2003 |
| WO | 2004018079 A2 | 3/2004 |
| WO | WO 2006/071979 | 7/2006 |

OTHER PUBLICATIONS

PCT International Search Report and Written Opinion for International Application No. PCT /US2009/052581 dated Aug. 3, 2008.

*Primary Examiner* — Joseph S Del Sole
*Assistant Examiner* — James Sanders (57) ABSTRACT

A method of making a composite filter media includes, in an exemplary embodiment, forming a nonwoven fabric mat that includes a plurality of synthetic fibers by a spunbond process, and calendering the nonwoven fabric mat with embossing calender rolls to form a bond area pattern comprising a plurality of substantially parallel discontinuous lines of bond area to bond the synthetic fibers together to form a nonwoven fabric, the nonwoven fabric having a filtration efficiency of about 35% to less than 50%, measured in accordance with EN 1822 (1998) test procedure. The method also includes applying a nanofiber layer by electro-blown spinning a polymer solution to form a plurality of nanofibers on at least one side of the nonwoven fabric mat to form the composite filter media, the composite filter media having a minimum filtration efficiency of about 70%, measured in accordance with EN 1822 (1998) test procedure.

15 Claims, 7 Drawing Sheets

U.S. PATENT DOCUMENTS

| | | |
|---|---|---|
| 6,924,028 B2 | 8/2005 | Chung et al. |
| 6,994,742 B2 | 2/2006 | Barris et al. |
| 7,008,465 B2 | 3/2006 | Graham et al. |
| 7,090,715 B2 | 8/2006 | Chung et al. |
| 2004/0060268 A1* | 4/2004 | Chung et al. ............... 55/482 |
| 2004/0131820 A1* | 7/2004 | Turner et al. ............... 428/92 |
| 2005/0067732 A1 | 3/2005 | Kim et al. |
| 2006/0089067 A1* | 4/2006 | Baker et al. ............... 442/62 |

* cited by examiner

FIG. 9 ously greater than 7.0 mm H₂O, and a Qual-
METHOD OF MANUFACTURING A COMPOSITE FILTER MEDIA

BACKGROUND OF THE INVENTION

The field of the invention relates generally to a composite nonwoven filter media, and more particularly, to a spunbond nonwoven filter media having a nanofiber based layer applied to at least one surface.

Some known filter media composite constructs incorporate a wet-laid paper making process to produce the substrate, and an electro-spun technology to deposit a lightweight nanofiber coating on one or both sides of the filter media substrate. Typically the media substrate has a basis weight of 100-120 grams per square meter ($g/m^2$), and the nanofiber layer has a basis weight of 0.1 $g/m^2$ or less.

It is known that the lightweight nanofiber layer is vulnerable to damage in high mechanical stress applications, especially because the nanofiber layer is formed from fibers with diameters less than 500 nanometer (nm), and more typically, 100 nm. It is known that there are "shedding" problems where the nanofibers are shed from the filter media because of relatively weak attraction bonds between the nanofibers and the base media for conventional electro-spun fibers that rely on polarity attraction forces. Also, known electro-spun nanofiber layers are two dimensional in structure or a single fiber layer in thickness, and when the nanofiber layer cracks or breaks, dust can readily penetrate the base media substrate After the nanofiber layer is damaged, dust is permitted to penetrate the base media and contribute to a rise in the operating pressure drop of the filter. Further, known media substrates also have mechanical stress limitations and are prone to deformation under high dust loading.

These known filter media composite constructs when used to filter inlet air of power generation gas turbines can permit fine dust particulates to penetrate the filter over the operating life of the filter. Typically, this known filter media type will have a new or clean operating electrically neutral efficiency providing for around 55% of capture of 0.4 µm particles, at a pressure drop typically greater than 7.0 mm $H_2O$, and a Quality Factor less than 300, when tested in accordance with the EN 1822 (1998) test procedure at the known operating flow rate. It is known that as much as 15 to 20 pounds of dust can penetrate known filter media over a 24,000 hour operating life because of this low initial efficiency. Exposing the turbine blades to dust over an extended time can cause serious and catastrophic fouling and erosion of the turbine blades. The current procedure of cleaning the turbine blades requires taking the turbine off-line at periodic intervals to water wash the blades clean. Turbine down time is expensive because the turbine is not operating and therefore, power generation is curtailed. It would be desirable to provide a higher efficiency filter media than the known filter media at a similar or reduced pressure drop to reduce or eliminate turbine down time to clean the turbine blades and/or the replacement of damaged blades.

BRIEF DESCRIPTION OF THE INVENTION

In one aspect, a method of making a composite filter media is provided. The method includes forming a nonwoven fabric mat that includes a plurality of synthetic fibers by a spunbond process, and calendering the nonwoven fabric mat with embossing calender rolls to form a bond area pattern comprising a plurality of substantially parallel discontinuous lines of bond area to bond the synthetic fibers together to form a nonwoven fabric, the nonwoven fabric having a filtration efficiency of about 35% to less than 50%, measured in accordance with EN 1822 (1998) test procedure. The method also includes applying a nanofiber layer by electro-blown spinning a polymer solution to form a plurality of nanofibers on at least one side of the nonwoven fabric mat to form the composite filter media, the composite filter media having a minimum filtration efficiency of about 70%, measured in accordance with EN 1822 (1998) test procedure.

DETAILED DESCRIPTION OF THE INVENTION

A composite filter media for filter assemblies is described in detail below. In an exemplary embodiment, the composite filter media includes a media substrate of a synthetic nonwoven fabric that is formed from two layers of fibers by a unique spunbond process. A nanofiber layer is deposited on at least one side of the media substrate. The composite media provides an initial filtration efficiency of about 70% or greater retained capture of 0.4 µm particles when tested in accordance with the European Standard EN 1822 (1998) test procedure, which is about a 15% increase in performance compared to known filter media. In addition, the composite media provides the 70% efficiency at a greater than 30% lower pressure drop than known filter media. The method includes forming a nonwoven fabric mat that includes a plurality of synthetic fibers by a spunbond process, and calendering the nonwoven fabric mat with embossing calender rolls to form a bond area pattern comprising a plurality of substantially parallel discontinuous lines of bond area to bond the synthetic fibers together to form a nonwoven fabric, the nonwoven fabric having a filtration efficiency of about 35% to less than 50%, measured in accordance with EN 1822 (1998) test procedure.

The composite filter media is more durable than known filter media and provides for lower pressure drop build-up because of less deflection of the filter media from the forces exerted on the filter media during the filtering and reverse cleaning operations. The composite filter media may have a quality factor ($Q_f$) of greater than about 370, and in the preferred embodiment, greater than about 440. Also, the composite filter media may have a resistance (or pressure drop) of less than 4.0 mm water, measured in accordance with EN-1822 (1998), with the base media substrate having a resistance of less than about 2.5 mm water, measured in accordance with EN-1822 (1998). Further, the nanofiber membrane layer has a higher basis weight than known filter media which permits the filter media to clean down more effectively under reverse pulse cleaning than known filter media. The high basis weight of the nanofiber layer provides for a durable three dimensional surface filtration layer which has an extensive tortuous path that permits high efficiency and fine particle capture without substantially restricting air flow or increasing pressure drop.

By "quality factor ($Q_f$)" is meant the parameter defined by the equation:

$$Q_f = -25000 \cdot \log(P/100)/\Delta p$$

Where "P"=particle penetration in % and "$\Delta p$"=pressure drop across the media in Pascals.

By "resistance" is meant the resistance (pressure drop) as measured using the test method described in EN 1822 (1998).

Figure 1:
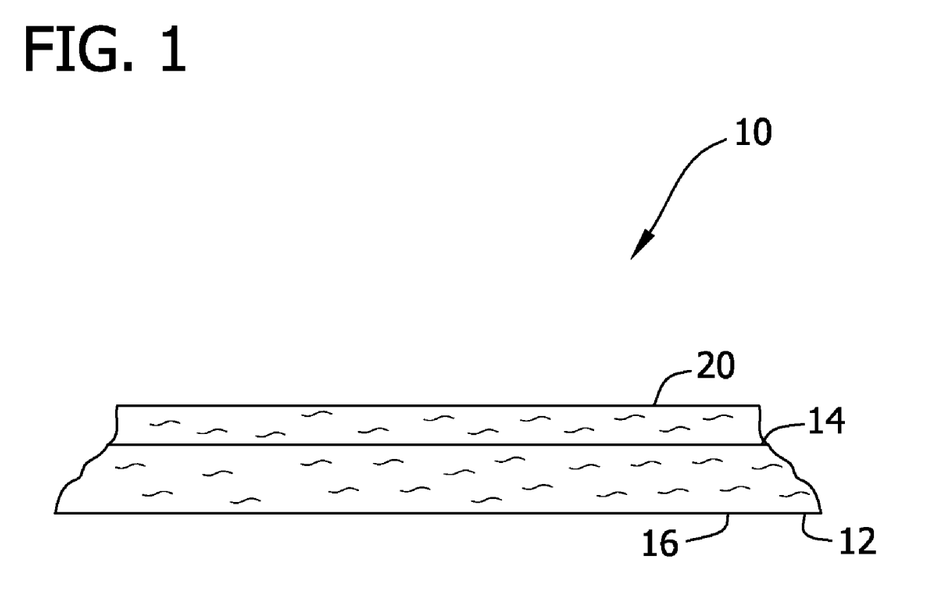
FIG. 1 is cross sectional illustration of an exemplary embodiment of a composite filter media.

Referring to the drawings, FIG. 1 is a sectional illustration of an exemplary embodiment of a filter media 10. Filter media 10 includes a base media substrate 12 having a first side 14 and a second side 16. A nanofiber layer 20 is deposited onto first side 14 of media substrate. In another embodiment, nanofiber layer 20 is deposited onto second side 16, and in another embodiment, nanofiber layer 20 is deposited on each of first and second sides 14 and 16.

Figure 2:
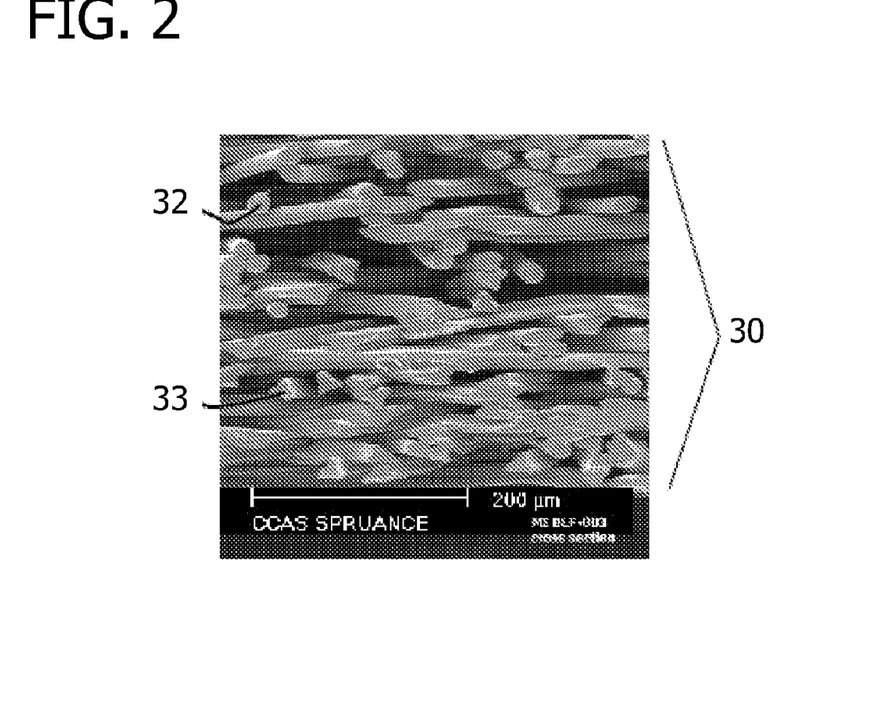
FIG. 2 is a photomicrograph of the fibers shown in FIG. 1.
Figure 3:
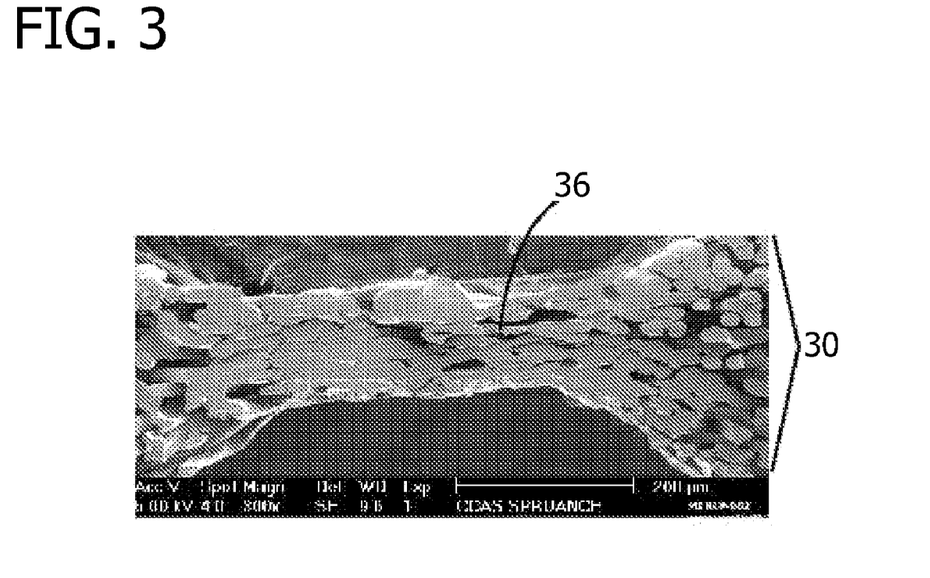
FIG. 3 is a photomicrograph of the base media substrate shown in FIG. 1.

Media substrate 12 is a nonwoven fabric formed from synthetic fibers using a spunbond process. The nonwoven fabric comprises dual fiber cross-section shapes. Suitable dual fiber layer cross-sections can have fiber shapes having a round structure, or a trilobal structure. Referring also to FIG. 2, in the exemplary embodiment, a dual fiber cross-section 30 includes a layer of cylindrical shaped fibers 32 and a layer of trilobal shaped fibers 33. Fibers 32 and 33 are meltspun through jets into a plurality of continuous fibers which are uniformly deposited into a random three dimensional web. The web is then heated and embossed calendered which thermally bonds the web into a consolidated spunbond fabric 36, shown in FIG. 3. Heat from contact of the calender roll embossing pattern softens or melts the thermoplastic fibers 30 which bind the nonwoven fibers together at the contact points of calender roll embossing pattern. The temperature is selected so that at least softening or fusing of the fibers 30 occurs. In one embodiment, the temperature is about 90° C. to about 240° C. The desired connection of the fibers is caused by the melting and re-solidification of the fibers 32 and 33 after cooling.

Round fibers 32 have diameter of about 18 microns to about 23 microns and trilobal fibers 33 have point to point cross-section distances of about 22-30 microns.

Figure 4:
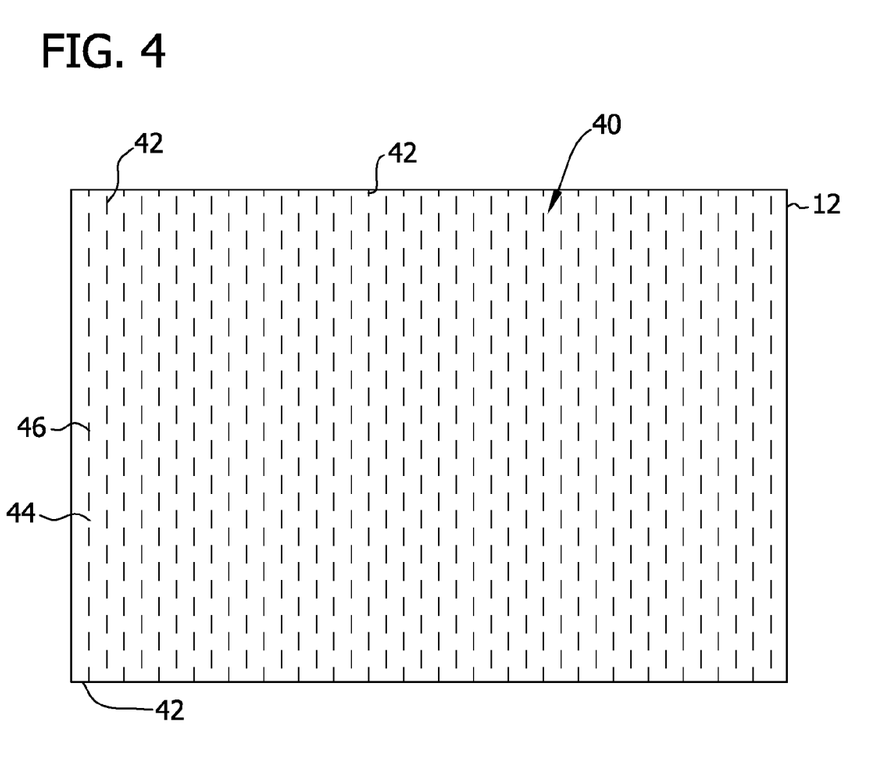
FIG. 4 is a top illustration of the bond pattern of the base media substrate shown in FIG. 1

Referring to FIG. 4, a bond pattern 40 on base media 12 attains an acceptable durability to base media 12, while allowing more fiber to be available for filtration thus increasing filtration efficiency. Bond pattern 40 includes a plurality of parallel discontinuous lines 42 of bond area extending across base media 12. The parallel discontinuous lines 42 of bond area are off-set from each other so that at a location of no bond area 44 in a discontinuous line 42 is aligned with a bond area 46 of an adjacent discontinuous line 42. In the exemplary embodiment the basis weight of base media 12 is about 100 g/m² to about 330 g/m², in another embodiment, about 100 g/m² to about 220 g/m².

Any suitable synthetic fiber can be used to make the nonwoven fabric of media substrate 12. Suitable materials for round fibers 32 and trilobal fibers 33 include, but are not limited to, polyester, polyamide, polyolefin, thermoplastic polyurethane, polyetherimide, polyphenyl ether, polyphenylene sulfide, polysulfone, aramid, and mixtures thereof.

In the exemplary embodiment, nanofiber layer 20 is formed by an electro-blown spinning process that includes feeding a polymer solution into a spinning nozzle, applying a high voltage to the spinning nozzle, and discharging the polymer solution through the spinning nozzle while injecting compressed air into the lower end of the spinning nozzle. The applied high voltage ranges from about 1 kV to about 300 kV. The electro-blown spinning process of forming nanofibers and the unique apparatus used is described in detail in U.S. Patent Application Publication No. 2005/00677332. The electro-blown spinning process provides a durable three dimensional filtration layer of nanofibers that is thicker than known nanofiber filtration layers on known filter media. In the exemplary embodiment the basis weight of nanofiber layer 20 is about 0.6 g/m² to about 20 g/m², in another embodiment, about 2 g/m² to about 20 g/m², in another embodiment, about 5 g/m² to about 10 g/m², in another embodiment, about 1.5 g/m² to about 2.5 g/m². The nanofibers in nanofiber layer 20 have an average diameter of about 500 nm or less.

In alternate embodiments, nanofiber layer 20 may be formed by electrospinning, centrifugal spinning, or melt blowing. Classical electrospinning is a technique described in detail in U.S. Pat. No. 4,127,706. A high voltage is applied to a polymer in solution to create nanofibers and nonwoven mats. However, total throughput in electrospinning processes is too low to be viable in forming heavier basis weight webs. Centrifugal spinning is a fiber forming process that includes supplying a spinning solution having at least one polymer dissolved in at least one solvent to a rotary sprayer having a rotating conical nozzle. The nozzle has a concave inner surface and a forward surface discharge edge. The spinning solution moves through the rotary sprayer along the concave inner surface so as to distribute the spinning solution toward the forward surface of the discharge edge of the nozzle. Separate fibrous streams are formed from the spinning solution while the solvent vaporizes to produce polymeric fibers in the presence or absence of an electrical field. A shaping fluid can flow around the nozzle to direct the spinning solution away from the rotary sprayer. The fibers are collected onto a collector to form a nanofiber web. In addition, melt blowing is described in detail in U.S. Pat. No. 6,520,425.

Suitable polymers for forming nanofibers by the electro-blown spinning process are not restricted to thermoplastic polymers, and may include thermosetting polymers. Suitable polymers include, but are not limited to, polyimides, polyamides (nylon), polyaramides, polybenzimidazoles, polyetherimides, polyacrylonitriles, polyethylene terephthalate, polypropylene, polyanilines, polyethylene oxides, polyethylene naphthalates, polybutylene terephthalate, styrene butadiene rubber, polystyrene, polyvinyl chloride, polyvinyl alcohol, polyvinylidene chloride, polyvinyl butylene, polyacetal, polyamide, polyester, polyolefins, cellulose ether and ester, polyalkylene sulfide, polyarylene oxide, polysulfone, modified polysulfone polymers, and mixtures thereof. Also, materials that fall within the generic classes of poly (vinylchloride), polymethylmethacrylate (and other acrylic resins), polystyrene, and copolymers thereof (including ABA type block copolymers), poly (vinylidene fluoride), poly (vinylidene chloride), polyvinylalcohol in various degrees of hydrolysis (87% to 99.5%) in crosslinked and non-crosslinked forms may be used and copolymer or derivative compounds thereof. One suitable class of polyamide condensation polymers are nylon materials, such as nylon-6, nylon-6,6, nylon 6,6-6,10, and the like. The polymer solution is prepared by selecting a solvent that dissolves the selected polymers. The polymer solution can be mixed with additives, for example, plasticizers, ultraviolet ray stabilizers, crosslink agents, curing agents, reaction initiators, and the like. Although dissolving the polymers may not require any specific temperature ranges, heating may be needed for assisting the dissolution reaction.

It can be advantageous to add plasticizers to the various polymers described above, in order to reduce the $T_g$ of the fiber polymer. Suitable plasticizers will depend upon the polymer, as well as upon the particular end use of the nanofiber layer. For example, nylon polymers can be plasticized with water or even residual solvent remaining from the electrospinning or electro-blown spinning process. Other plasticizers which can be useful in lowering polymer $T_g$ include, but are not limited to, aliphatic glycols, aromatic sulphanomides, phthalate esters, including but not limited to, dibutyl phthalate, dihexl phthalate, dicyclohexyl phthalate, dioctyl phthalate, diisodecyl phthalate, diundecyl phthalate, didodecanyl phthalate, and diphenyl phthalate, and the like.

Figure 5:
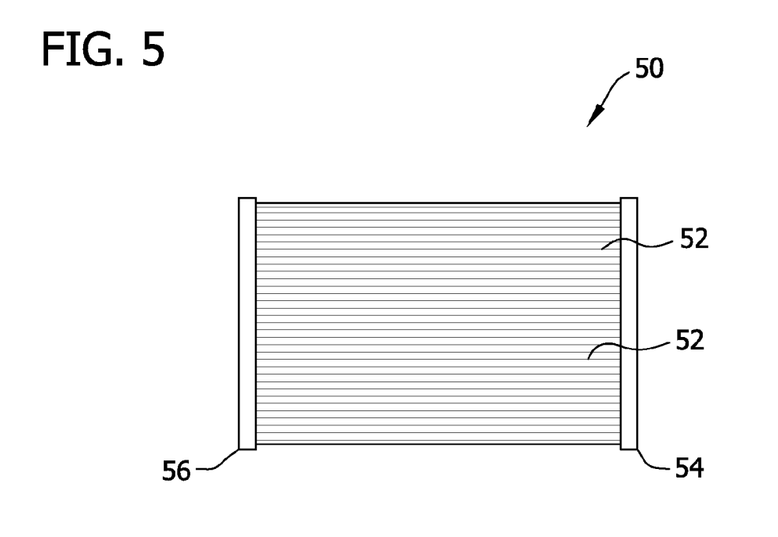
FIG. 5 is a side illustration of a filter cartridge that includes the filter media shown in FIG. 1.
Figure 6:
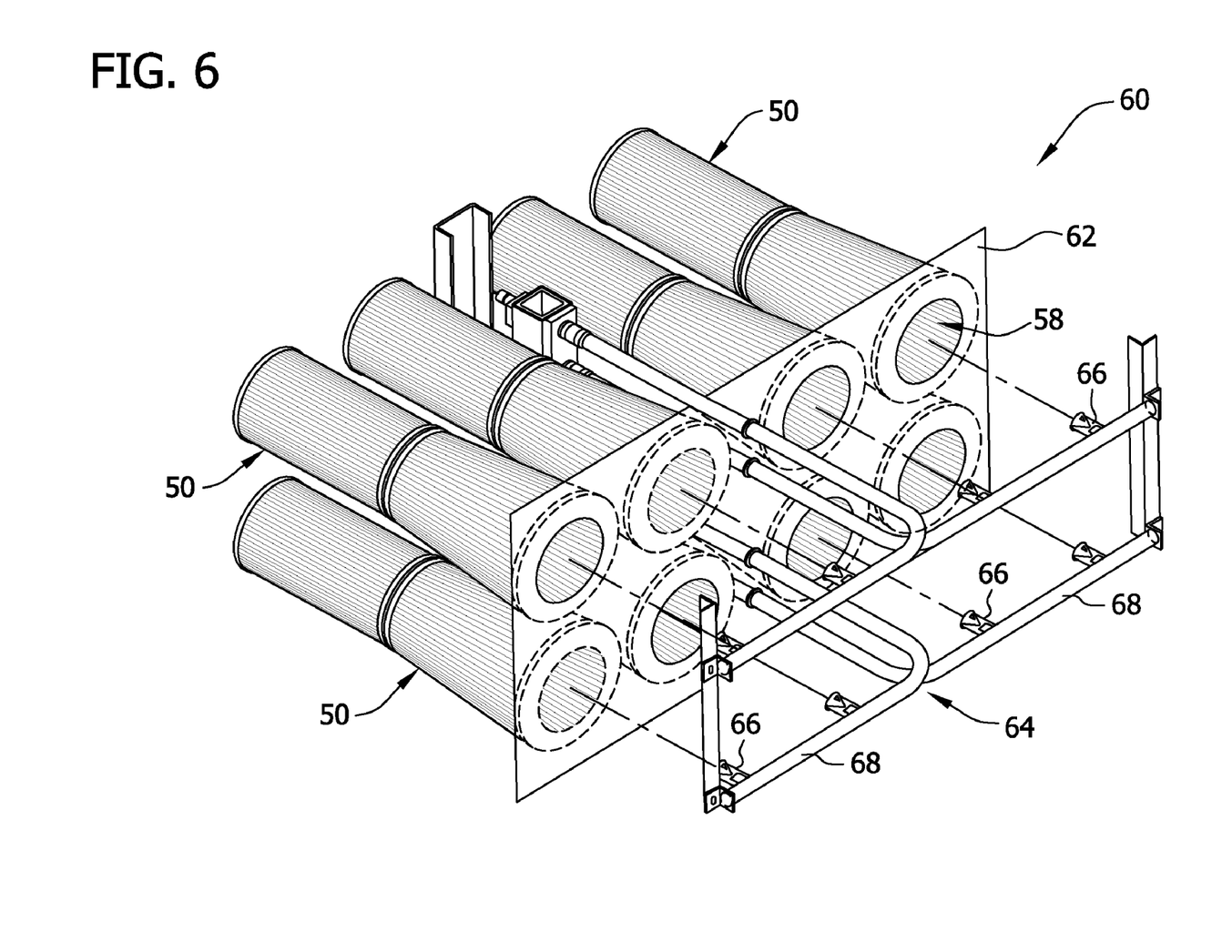
FIG. 6 is a perspective illustration of a filter assembly that includes the filter cartridge shown in FIG. 4.

FIG. 5 is a side illustration of a filter element 50 formed from filter media 10. In the exemplary embodiment, filter media 10 includes a plurality of pleats 52. Filter element 50 includes a first end cap 54 and an opposing second end cap 56 with filter media 10 extending between end caps 54 and 56. Filter element 50 has a tubular shape with an interior conduit 58 (shown in FIG. 6). Filter element 50 is cylindrical in shape, but can also be conical as shown in FIG. 6. Filter element 50 can also include an inner and/or an outer support liner to provide structural integrity of filter element 50 and/or support for filter media 10.

FIG. 6 is a perspective illustration of a filter assembly 60 that includes a plurality of filter elements 50 mounted to a tube sheet 62 in pairs in an end to end relationship. Tube sheet 62 separates the dirty air side from the clean air side of filter assembly 60. A cleaning system 64 for cleaning filter elements 50 with pulsed air includes a plurality of air nozzles 66 mounted to air supply pipes 68. Pulses of compressed air directed into interior conduit 58 of filter elements 50 are used to clean filter elements 50 of collected dirt and dust.

Figure 7:
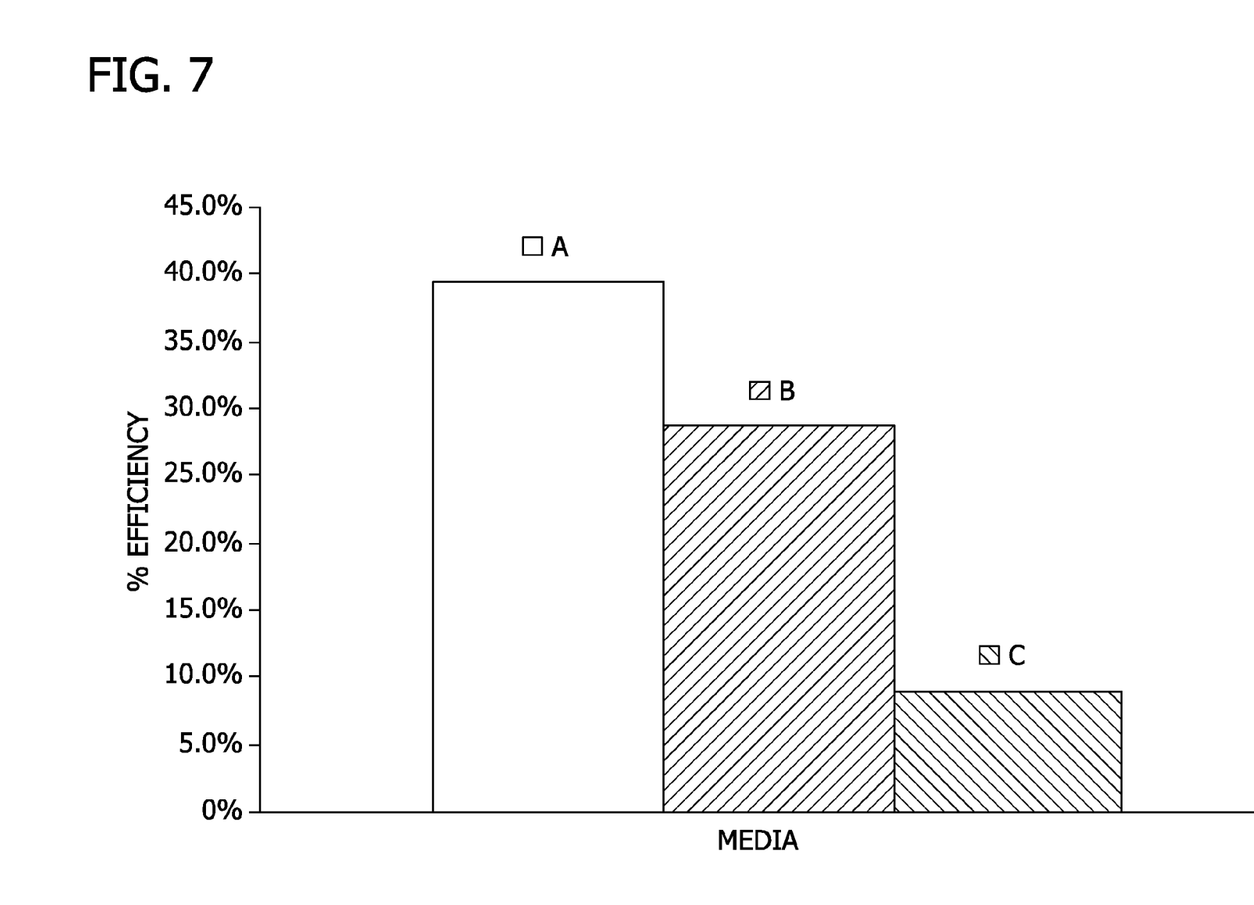
FIG. 7 is a bar graph of fractional efficiency at 0.3 microns of base media substrates at various basis weights in accordance with an exemplary embodiment.
Figure 8:
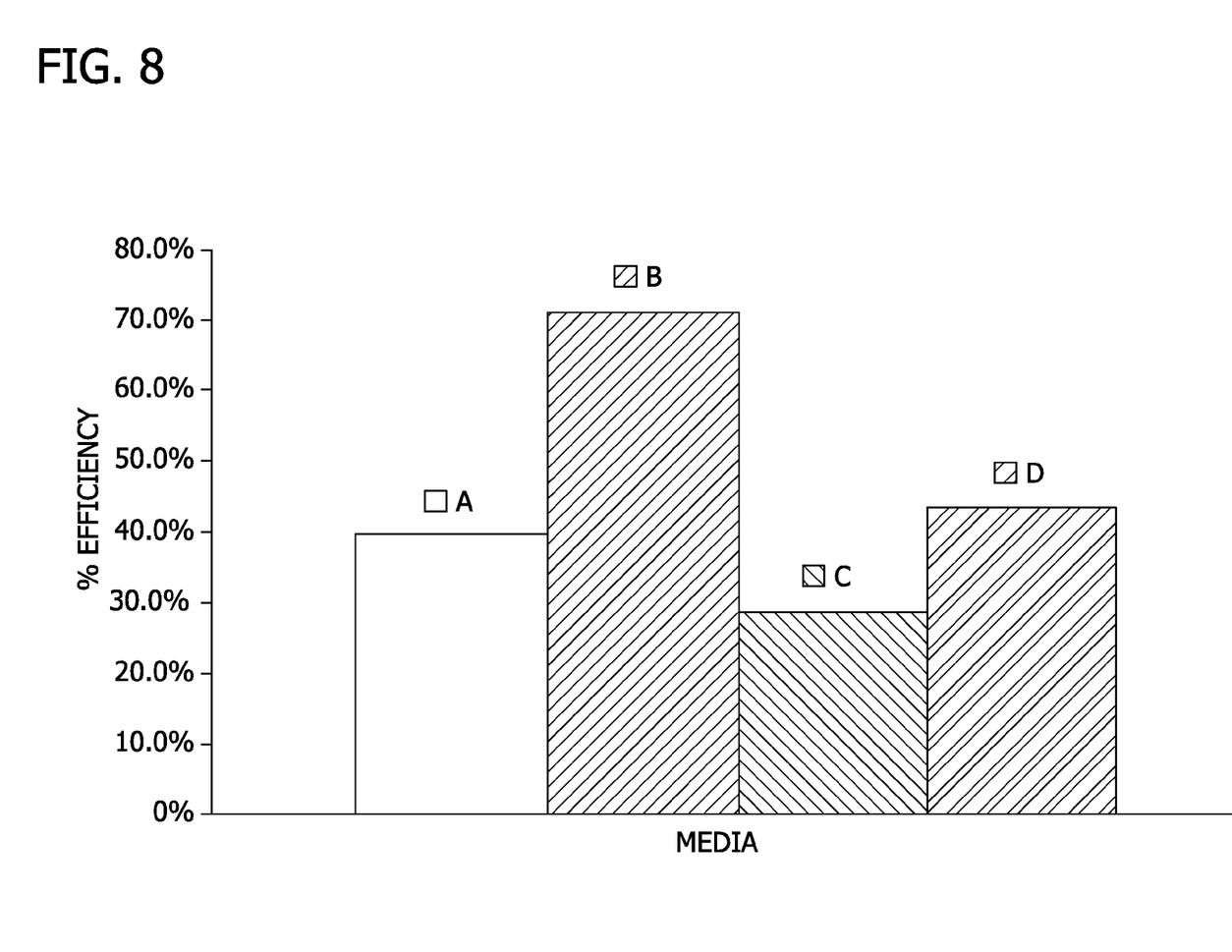
FIG. 8 is a bar graph of fractional efficiency at 0.3 microns of base media substrates with and without a nanofiber layer in accordance with an exemplary embodiment compared to a comparative base media substrate with and without a nanofiber layer.

Flat sheets of base media substrate 12 test samples having various basis weights were compared to a comparative base media substrate in a flat sheet fractional efficiency test in accordance with EN 1822 (1998) test method. Air containing DEHS particles was directed through each test sample at a flow rate of about 5.3 cm/s. FIG. 7 shows a graphical representation of the comparison test and the enhanced filtration efficiency performance of spunbond base media 12. Bar A represents base substrate 12 at a basis weight of 165 g/m², and Bar B represents a comparative base substrate at a basis weight of 230 g/m². Bar C represents a comparative base media substrate with a basis weight of 130 g/m². The base media substrates did not include a nanofiber layer. Base media substrate 12 has a higher efficiency than the comparative base at the 0.3 micron particle size tested at 5.3 cm/s Flat sheets of base media substrate 12, and base media substrate 12 including nanofiber layer 20 were compared to a comparative base media substrate with and without a nanofiber layer in a flat sheet fractional efficiency test in accordance with EN 1822 (1998) test method. Air containing 0.3 micron DEHS particles was directed through each test sample at a flow rate of about 5.3 cm/s. FIG. 8 shows a graphical representation of the comparison test. Bar A represents base media substrate 12 at 165 g/m², and Bar B represents base media substrate 12 at 165 g/m², including nanofiber layer 20. Bar C represents a comparative base media substrate and Bar D represents the comparative base media substrate including a nanofiber layer. Base media substrate 12 with and without nanofiber layer 20 had a higher efficiency than the comparative base substrate with and without a nanofiber layer.

Figure 9:
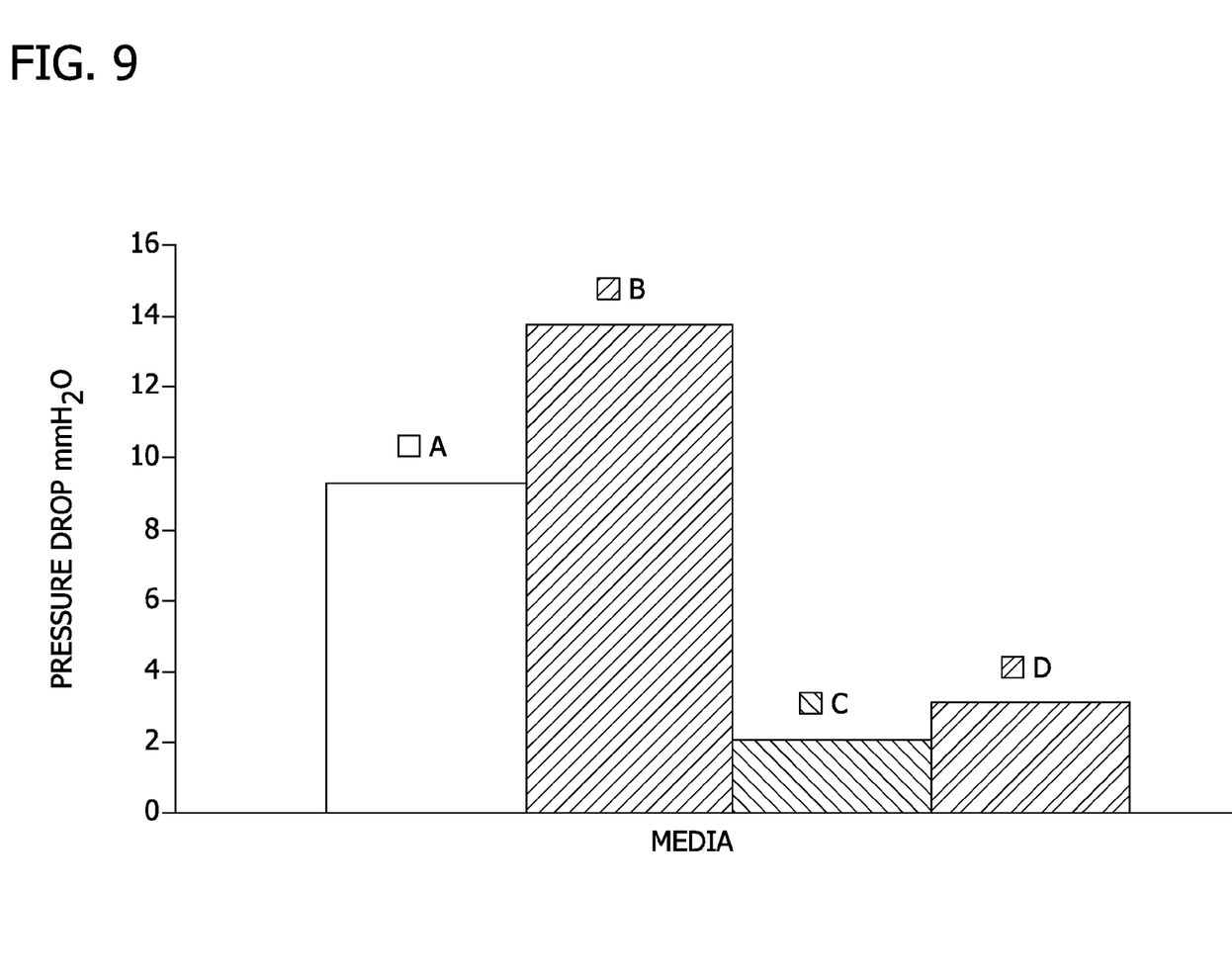
FIG. 9 is a bar graph of pressure drop versus base media substrate with and without a nanofiber layer in accordance with an exemplary aspect compared to a comparative base media substrate with and without a nanofiber layer.

Flat sheets of base media substrate 12, and base media substrate 12 including nanofiber layer 20 were compared to a comparative base media substrate with and without a nanofiber layer in a flat sheet pressure drop test in accordance with EN 1822 (1998) test method. Air containing DEHS particles was directed through each test sample at a flow rate of about 5.3 cm/s FIG. 9 shows a graphical representation of the comparison test. Bar A represents a comparative base media substrate and bar B represents the comparative base media substrate including a nanofiber layer. Bar C represents base media substrate 12 at 165 g/m², and bar D represents base media substrate 12 at 165 g/m², including nanofiber layer 20. Base media substrate 12 with and without nanofiber layer 20 had a lower pressure drop than the comparative base substrate with and without a nanofiber layer.

The above described filter elements 50 formed from filter media 10 can be used for filtering an air stream in almost any application, for example, for filtering gas turbine inlet air. The unique construction of filter media 10 is more durable than known filter media and provides for relatively lower pressure drop build-up because of less deflection from the forces exerted on the filter media during the filtering and reverse cleaning operations. Filter elements 50 can produce an average efficiency greater than about 70% capture of the most penetrating particle size of aerosol or dust (about 0.3 to about 0.4 micron) as compared to an efficiency of about 50-55% of known filter elements. Also, nanofiber layer 20 has a higher basis weight than known filter media which permits filter media 10 to clean down more effectively under reverse pulse cleaning than known filter media. Further, the high basis weight of nanofiber layer 20 provides for a durable three dimensional surface filtration layer which has an extensive tortuous path that permits high efficiency and fine particle capture without restricting air flow or increasing pressure drop.

The example filter media of Examples 1 and 2 and Comparative Examples 3-7 illustrate a comparison of embodiments of filter media 10 with known filter media. Efficiency, resistance and quality factor were measured for each filter media of Examples 1 and 2 and Comparative Examples 3-7. Efficiency was measured in accordance with EN-1822 (1998) test procedure, resistance was measured in accordance with EN-1822 (1998), and quality factor $Q_f$ was calculated as described above.

Example 1 is a spunbond polyester dual layer base media substrate containing round and trilobal fibers, and Example 2 is the base media substrate of Example 1 plus a 2 g/m² nanofiber layer formed by a electro-blown spinning process. Comparative Example 3 is a known drylaid polyester base media substrate, and Comparative Example 4 is the known dry-laid polyester base media substrate of Comparative Example 3 plus a 2 g/m² nanofiber layer. Comparative Example 5 is a wet-laid synthetic paper plus a <0.5 g/m² nanofiber layer. Comparative Example 6 is a wet-laid synthetic paper, and Comparative Example 7 is the wet-laid synthetic paper of Example 6 plus a 20 g/m² meltblown fiber layer. The example results are shown in Table I below. When Example 2 is compared to composites in Comparative Examples 4, 5, and 7, efficiency is not sacrificed at the expense of reducing resistance which yields the associated high Quality Factor values.

TABLE I

| Example | Basis Weight (g/m²) | Efficiency (%) | Resistance (mm H₂O) | Quality Factor |
|---|---|---|---|---|
| Example 1 Spunbond Polyester Dual Layer Fiber Base | 169.9 | 39.4 | 2.07 | 267 |
| Example 2 Spunbond Polyester Dual Layer Fiber Base + 2 g/m² Nanofiber Layer | 170.3 | 71.4 | 3.1 | 447 |
| Comparative Example 3 Drylaid Polyester Base | 234.9 | 28.7 | 9.3 | 40 |
| Comparative Example 4 Drylaid Polyester Base + 2 g/m² Nanofiber Layer | 236.3 | 43.2 | 13.81 | 45 |
| Comparative Example 5 Wet laid Synthetic Paper + <0.5 g/m² Nanofiber Layer | 121.2 | 40.5 | 9.77 | 59 |
| Comparative Example 6 Wetlaid Synthetic Paper | 133.4 | 9.0 | 7.67 | 14 |
| Comparative Example 7 Wetlaid Synthetic Paper + 20 g/m² Meltblown Fiber Layer | 150.2 | 86.4 | 8.79 | 251 |

Efficiency measured at 0.3 microns, 5.3 cm/s face velocity EN 1822 (1998).
Resistance measured in accordance with EN-1822 (1998).
Quality Factor defined by the equation: $Q_f = -25000 \cdot \log(P/100)/\Delta p$ This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of making a composite filter media structure comprising:
    forming a nonwoven fabric mat comprising a plurality of synthetic fibers by a spunbond process;
    calendering the nonwoven fabric mat with embossing calender rolls to form a bond area pattern comprising a plurality of substantially parallel discontinuous lines of bond area to bond the synthetic fibers together to form a nonwoven fabric, the nonwoven fabric having a filtration efficiency of about 35% to less than 50%, measured in accordance with EN 1822 (1998) test procedure; and
    applying a nanofiber layer by electro-blown spinning a polymer solution to form a plurality of nanofibers on at least one side of the nonwoven fabric to form the composite filter media, the composite filter media having a minimum filtration efficiency of about 70%, measured in accordance with EN 1822 (1998) test procedure.

2. A method in accordance with claim 1, wherein said base substrate is comprised of a dual layer containing both round and trilobal fiber cross-sections.

3. A method in accordance with claim 1, wherein the nonwoven fabric and the nanofiber layer in combination are substantially electrically neutral.

4. A method in accordance with claim 1, wherein applying a nanofiber layer comprises applying a nanofiber layer by an electro-blown spinning process, an electrospinning process, a centrifugal spinning process, or a melt blowing process.

5. A method in accordance with claim 4, wherein said nanofiber layer comprises at least one of polyester, polyamide, polyolefin, thermoplastic polyurethane, polyetherimide, polyphenyl ether, polyphenylene sulfide, polysulfone, and aramid.

6. A method in accordance with claim 1, wherein calendering the nonwoven fabric mat comprises calendering the nonwoven fabric mat from a nonwoven fabric having a basis weight of about 100 g/m² to about 300 g/m².

7. A method in accordance with claim 1, wherein applying a nanofiber layer comprises applying a plurality of nanofibers having an average diameter of about 500 nm or less to form the nanofiber layer having a basis weight of about 0.6 g/m² to about 20 g/m².

8. A method in accordance with claim 1, wherein applying a nanofiber layer comprises applying a plurality of nanofibers having an average diameter of about 500 nm or less to form the nanofiber layer having a basis weight of about 1.5 g/m² to about 2.5 g/m².

9. A method in accordance with claim 1, wherein calendering the nonwoven fabric mat with embossing calender rolls forms a bond area pattern comprising a plurality of substantially parallel discontinuous lines of bond area.

10. A method in accordance with claim 1, wherein forming a nonwoven fabric mat comprising a plurality of synthetic fibers by a spunbond process comprises forming a nonwoven fabric mat comprising a plurality of synthetic fibers with an average diameter of about 18 to about 30 microns.

11. A method in accordance with claim 1, wherein the nonwoven fabric has a resistance less than about 2.5 mm of water, measured in accordance with EN-1822 (1998), and said composite filter media structure has a resistance less than about 4.0 mm of water, measured in accordance with EN-1822 (1998).

12. A method in accordance with claim 11, wherein the quality factor $Q_f$ of said composite filter media structure is greater than about 370.

13. A method in accordance with claim 11, wherein the quality factor $Q_f$ of said composite filter media structure is greater than about 440.

14. A method in accordance with claim 1, wherein the nanofiber layer comprises a plurality of nanofibers, the nanofibers formed from polymers utilizing the electro-blown spinning process, the polymers comprising at least one of polyimides, polyamides, polyaramides, polybenzimidazoles, polyetherimides, polyacrylonitriles, polyethylene terephthalate, polypropylene, polyanilines, polyethylene oxides, polyethylene naphthalates, polybutylene terephthalate, styrene butadiene rubber, polystyrene, polyvinyl chloride, polyvinyl alcohol, polyvinylidene chloride, polyvinyl butylenes, and copolymer or derivative compounds thereof.

15. A method in accordance with claim 1, further comprising pleating the composite filter media.

* * * * *